(12) United States Patent
Ben Shlomo et al.

(10) Patent No.: US 7,878,376 B2
(45) Date of Patent: Feb. 1, 2011

(54) DRY GOODS DISPENSER AND DISPENSING MECHANISM

(75) Inventors: Tal E. Ben Shlomo, Ramat Hasharon (IL); Itamar Burstein, Tel Aviv (IL)

(73) Assignee: Golden GT LLC, Skokie, IL (US)

( * ) Notice: Subject to any disclaimer, the term of this patent is extended or adjusted under 35 U.S.C. 154(b) by 467 days.

(21) Appl. No.: 11/703,627

(22) Filed: Feb. 8, 2007

(65) Prior Publication Data

US 2008/0190964 A1   Aug. 14, 2008

(51) Int. Cl.
  *G01F 11/10* (2006.01)
(52) U.S. Cl. .................. 222/368; 222/406; 222/371; 198/533; 198/550.2
(58) Field of Classification Search ............ 222/368, 222/408, 367, 344, 305, 290, 220, 218, 185.1, 222/371, 406; 198/533, 550.2
See application file for complete search history.

(56) References Cited

U.S. PATENT DOCUMENTS

| | | | | |
|---|---|---|---|---|
| 1,431,659 A | * | 10/1922 | Hist | 222/226 |
| 1,637,601 A | * | 8/1927 | Bussey | 222/350 |
| 2,141,044 A | * | 12/1938 | Rassmann | 111/34 |
| 2,395,350 A | * | 2/1946 | Smith | 241/101.5 |
| 2,575,967 A | | 11/1951 | May | |
| 2,619,261 A | * | 11/1952 | Eric et al. | 222/371 |
| 3,169,675 A | * | 2/1965 | Gutzmann et al. | 222/360 |
| 3,336,956 A | * | 8/1967 | Thorn et al. | 141/83 |
| 4,056,215 A | * | 11/1977 | Zwahlen | 222/231 |
| 4,511,067 A | * | 4/1985 | Martin et al. | 222/230 |
| 4,733,891 A | * | 3/1988 | Cervinka | 291/27 |
| 4,893,737 A | * | 1/1990 | Borjesson | 222/360 |
| 4,960,024 A | * | 10/1990 | Holcomb | 83/423 |
| 5,007,561 A | * | 4/1991 | Wahl et al. | 222/55 |
| 5,615,830 A | * | 4/1997 | Matsunaga et al. | 239/8 |
| 5,833,097 A | * | 11/1998 | Ruth | 222/368 |
| 6,237,514 B1 | * | 5/2001 | Romans | 111/171 |
| 6,431,410 B1 | * | 8/2002 | Cuza | 222/371 |
| D500,636 S | | 1/2005 | Levy et al. | |
| D507,936 S | | 8/2005 | Gold et al. | |
| 6,964,355 B2 | | 11/2005 | Landau | |
| 7,082,891 B2 | * | 8/2006 | Watson | 118/24 |
| 2003/0234264 A1 | * | 12/2003 | Landau | 222/368 |

OTHER PUBLICATIONS

Search Report of Application No. EP 08151205, dated Jun. 11, 2008.

* cited by examiner

*Primary Examiner*—Kevin P Shaver
*Assistant Examiner*—Donnell Long
(74) *Attorney, Agent, or Firm*—Pearl Cohen Zedek Latzer LLP

(57) ABSTRACT

A device is provided for holding dispensing and conveying substances such as dry foods such as, for example, flour, breakfast cereal or granola. The device may include a stand holding a possibly hermetically sealed container which may include a conveyor, having a flexible paddle belt mounted on at least two axles and possibly at least one connector. The conveyor is connected to a handle which when rotated may cause the conveyor to rotate and dispense the dry substances such as food from the container into, for example, an outside bowl.

15 Claims, 4 Drawing Sheets

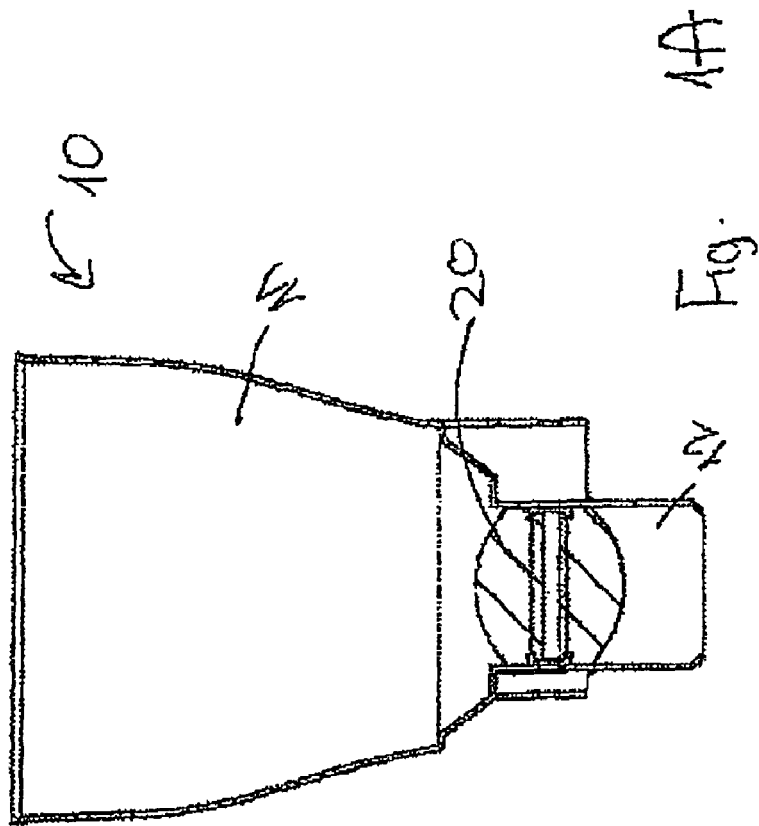
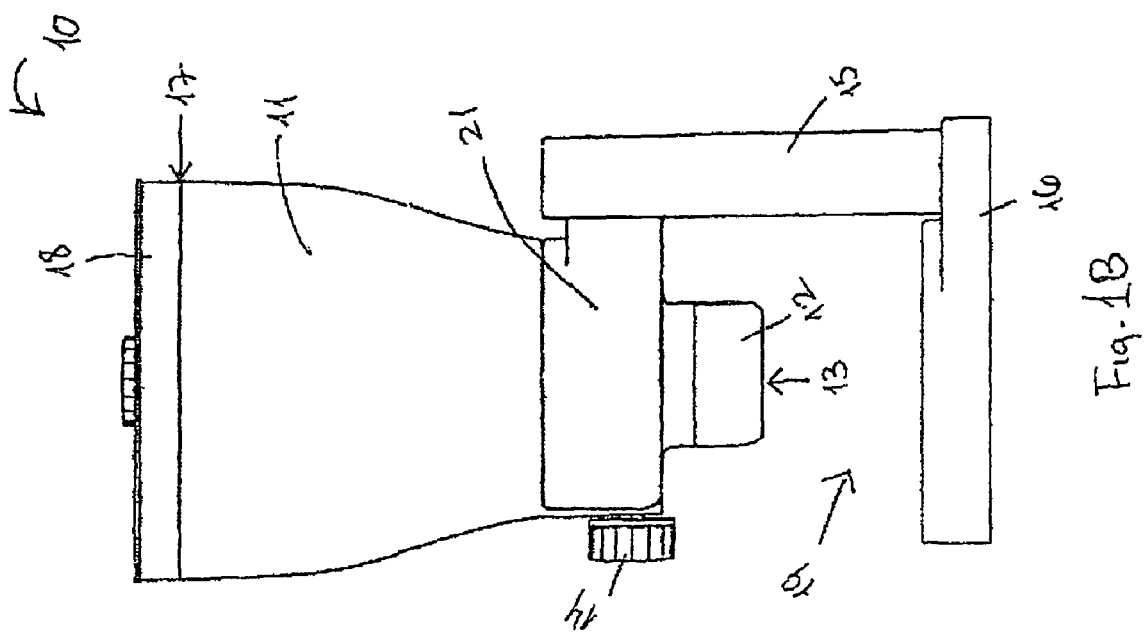

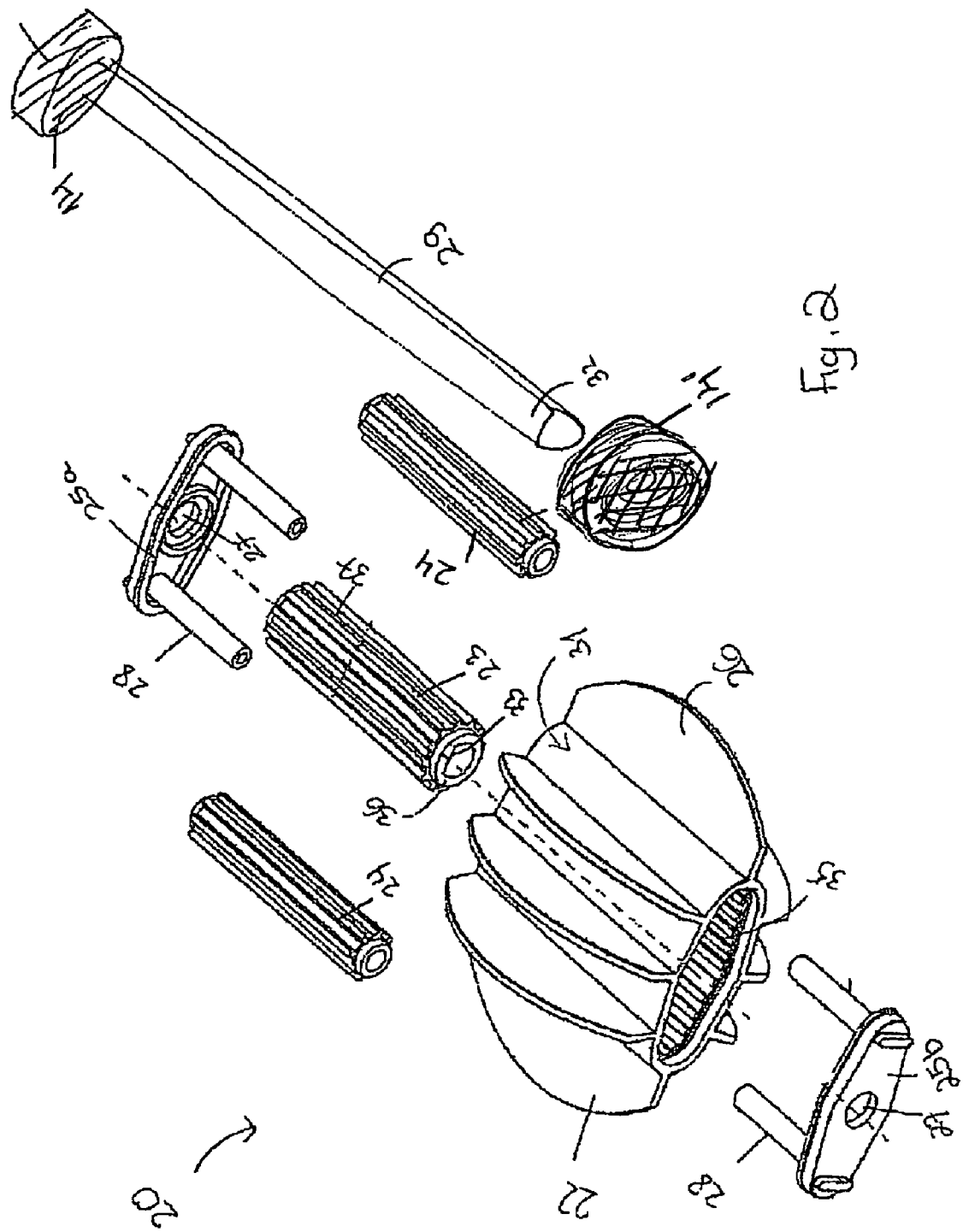

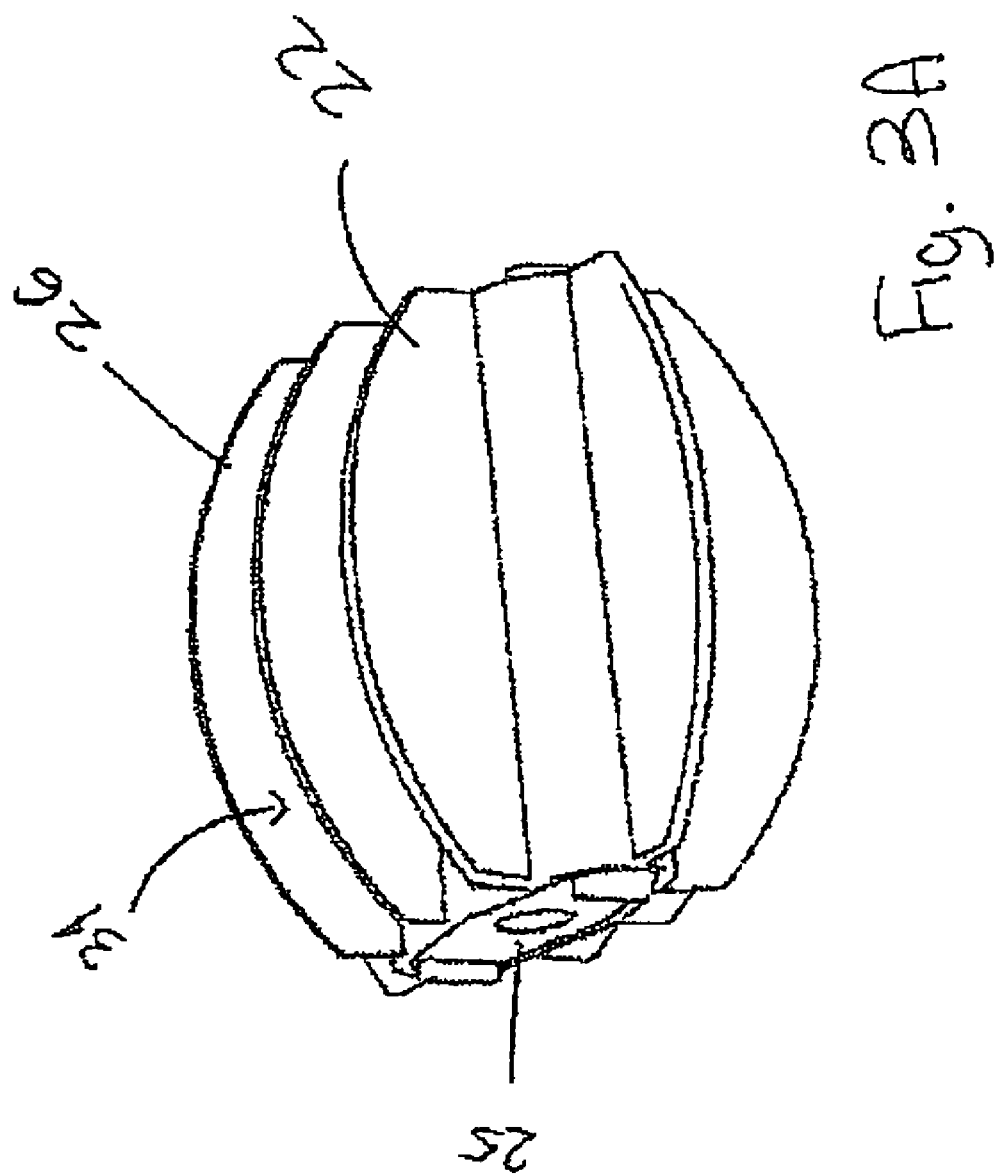

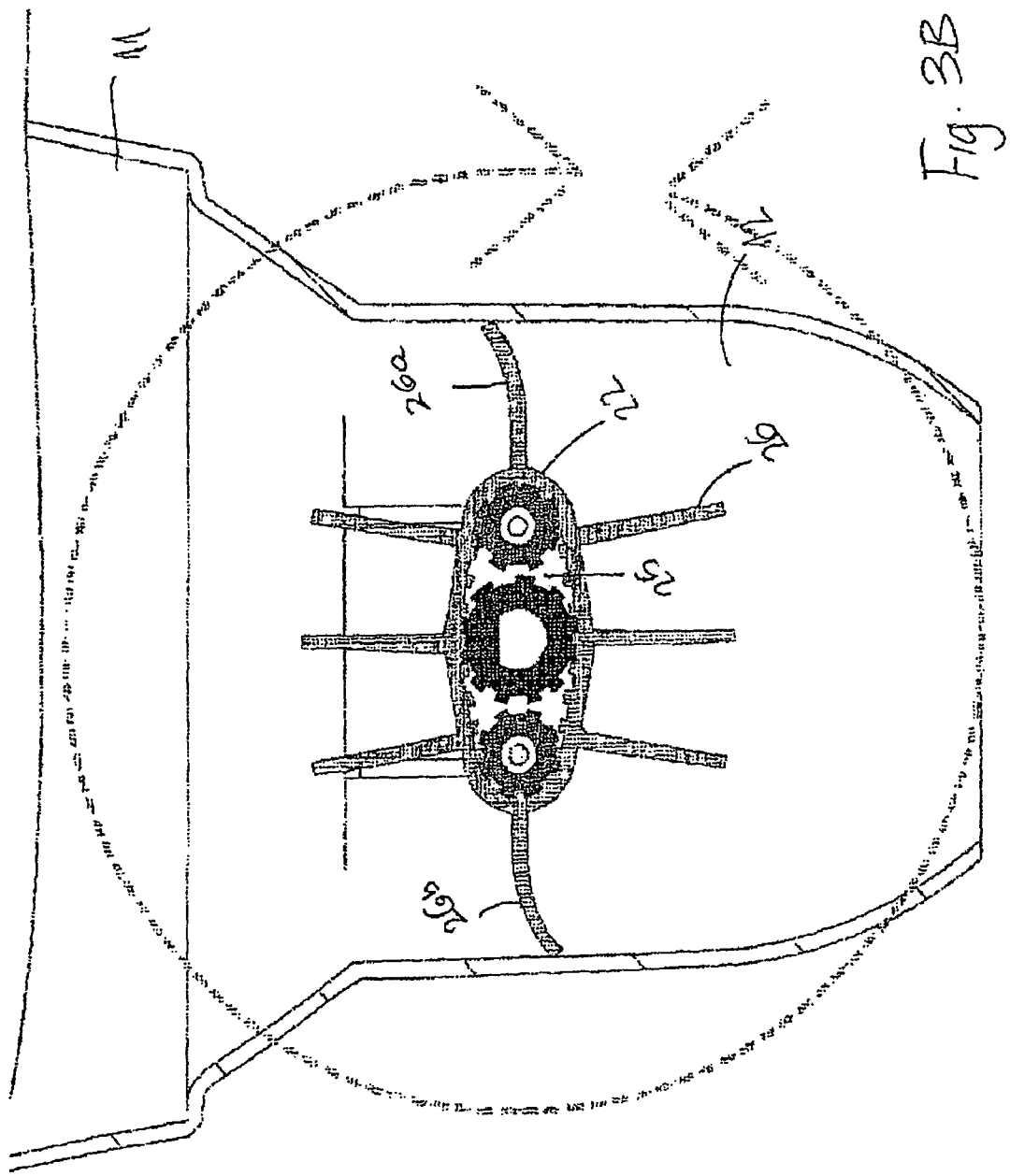

DRY GOODS DISPENSER AND DISPENSING MECHANISM

FIELD OF THE INVENTION

The present invention generally relates to devices for storing, dispensing and conveying dry materials such as powders or foods and, more particularly, to devices for storing and dispensing for example breakfast cereal, granola, grains and the like.

BACKGROUND OF THE INVENTION

Devices for storing and dispensing dry goods or foods such as, for example, powder breakfast cereal, granola and the like are known. However, there is a need for a device efficiently, hygienically and easily dispensing such materials while being hermetically sealed when not in use.

SUMMARY OF THE INVENTION

In one embodiment of the present invention, a device is provided for holding dispensing and conveying dry goods or foods such as, for example, breakfast cereal or granola. The device may include a stand holding a possibly hermetically sealed container which may include a conveyor, having a flexible paddle belt mounted on at least two axles and at least one connector. The conveyor is connected to a handle which when rotated may cause the conveyor to rotate and dispense the dry food from the container into, for example, an outside bowl.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIGS. 1A and 1B depict a dry food dispensing device, according to one embodiment of the present invention;

FIG. 2 depicts an exploded view of elements of a dry food dispensing device, according to one embodiment of the present invention; and FIGS. 3A and 3B depict different views of an element of a dry food dispensing device, according to one embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

FIGS. 1A and 1B depict a dry food dispensing device, according to one embodiment of the present invention. Referring to FIG. 1A device 10 may include a container or receptacle 11 which may be used for holding and dispensing dry goods or food such as breakfast cereal, granola, flour, grains and the like. Other materials may be held. Container 11 may include a narrowing, funnel or neck 12 at its bottom or lower end, with a dispensing opening at the bottom or lower end of neck 12. Other structures or shapes may be used at the bottom or lower end of container 11. A conveyor 20 may be disposed within neck 12 and may be used for conveying or delivering the contents of container 11 into an outside container, bowl or the like (not shown). The conveyor may help to seal the lower end of neck 12.

Referring to FIG. 1B, in some embodiments container 11 may be connected to or inserted on a stand or holding element 15 which may include for example a flat base 16 to enable positioning of device 10 on a flat plane or flat surface and may allow a bowl or a container to be placed in an open space or area 19 below container 11 and above base 16 in order to collect the dispensed dry food, e.g., breakfast cereal. Stand 15 may include an upper horizontal arm 21, to which neck 12 is attached, possibly removably. A stand or support mechanism may have other configurations, and need not be used. Container 11 may include one or more handle(s) or knob(s) 14 connected to or extended from, for example, an axle or stem, at one end of container 11 to conveyor 20 as for example shown in FIG. 2. Container 11 may include an open lower end 13 (which may be the dispensing opening) and an open upper end 17. Handle 14 may be rotated or swiveled in order to cause movement or rotation of conveyor 20 and the conveying of the contents of container 11 through lower end 13 into an outside container, bowl or the like (not shown). Upper or top end 17 may be closed or sealed by for example a removable lid cover 18 which may in some embodiments form an airtight seal of container 11 and may be easily removed for refilling of container 11.

In some embodiments container 11 may be made, completely or partially, of a transparent material, or may include a transparent or open window of such material, such as glass, plastic or any suitable other transparent material in order for a user to see the content of container 11. Various components of the container may be for example plastic or glass, but other materials may be used. Other materials may be used if desired for certain components, for example fasteners or axles may be metal, and a conveyor or paddles on a conveyor may be for example silicone.

FIG. 2 depicts an exploded view of elements of a dry food dispensing device, according to one embodiment of the present invention. In one embodiment a belt or conveyor is mounted on at least two axles. One axle may be a "power" or turning axle, connected to for example one or more handles, and other axles may function to extend the belt so that the shape of the conveyor in cross section is for example extended or oblong, rather than circular; other configurations, including circular shaped belts, may be used. More than one "power" or turning axle may be used.

Referring to FIG. 2 conveyor 20 may include a flexible conveyor belt 22, which may be mounted on for example connectors 25a and 25b, main shaft, axle or bar 23 and one or more peripheral or side shafts, axles or bars 24. In one embodiment the main axle 23 is located towards the center of the belt 22 and side axles 24 are located off-center, but other arrangements are possible. In one embodiment the main axle 23 provides turning power and side axles 24 provides support and shape to the belt 22, but other functions and other methods of turning belt are possible in other embodiments. Conveyor belt 22 may include a set of flexible paddles or blades 26 pointing or oriented outwards from paddle belt 22. Paddles or blades 26 may have other structures or shapes. A dispensing area or section 31 may be formed between each pair of adjacent paddles 26. Paddle belt 22 may be made of a flexible material, such as, silicon, rubber, flexible plastic or polymer or the like. Any flexible or elastic material having sufficient flexibility to prevent breakage of the dry food pieces which in some uses may be contained in container 11 may be used.

According to some embodiments of the invention, connectors 25 may be round, oval, elliptical, egg-shaped, drop-shaped or the like. Any other shape or structure may be used. Connectors 25 may not be used. Connectors 25 may include an opening 27 and at least one side pivot 28 which may be removable or fixed to connector 25. Pivot(s) 28 may have an elongated for example cylindrical shape and its diameter may match the inner diameter of side axles or bars 24, which may be mounted on pivots 28. Other methods of mounting bars 24 may be used. A shaft 29 which may be attached to knob or handle 14 at one side may have the shape of for example an elongated cylinder having a flat side 32. In some embodiments, shaft 29 may include a screw or other connection mechanism at the other side which may be connected to another knob or handle 14'.

According to some embodiments of the invention, main bar 23 and one or more side bars 24 may be used as axles for the rotational movement of belt 22, and may support belt 22 in an oval, stretched or oblong, rather than round, shape. Main bar 23 may be located at the center of the belt ad side bars may be located not at the center of the belt. Main bar 23 may be shaped as an elongated cylinder with a flat side 33, and may be open at each end. Main bar 23 may include a protrusion 36 at each end to fit into opening 27 of connectors 25. Main bar or axle 23 may be mounted on shaft 29, which may in turn be held by openings 27 of connectors 25, but may be held or mounted in a different manner.

In some embodiments main bar 23 and side bars 24 outer circumference may have a set of cogs 37 which may for example fit into or be accepted by corresponding holes, openings or indentations in the inner circumference 35 of belt 22 and may allow belt 22 to slide on bars 23 and 24 while conveyor 20 is in movement. The diameter of side bars 24 may be smaller than the diameter of main bar 23. In some embodiments of the invention only one side bar may be used. Any number of side bars and main bars may be used. In other embodiments there may be no distinction between side and main bars, and the bars may be relatively equal in size. Further, in other embodiments, the bars or axles need not be mounted on a connector, but may be held or mounted differently.

In order to assemble conveyor 20, pivots 28 may be inserted through side bars 24 and protrusion 36 of main bar 23 may be aligned and held by openings 27 of connectors 25. In some embodiments axels 23 and/or 24 may be attached to connector 25. Paddle belt 22 may be positioned on connectors 25 and bars 24, 23. Referring to FIG. 1, conveyor 20 may be positioned in neck 12 of device 10 such that openings 27 may be aligned with hole(s) formed in neck 12 (not shown). Shaft 29 may be inserted through the holes in neck 12, openings 27 and main bar 23, such that flat side 32 is aligned with flat side 33 of main bar 23. In some embodiments shaft 29 may be held by friction and may not protrude through a far end of neck 12. In some embodiments shaft 29 may include a screw mechanism at one end (not shown) which may slightly protrude through the far end of neck 12 and an additional handle may be fixed on the screw mechanism to allow rotation of conveyor 20 from both sides. Conveyor 20 may be easily disassembled by removing shaft 29 connectors 25 and bars 23 and 24. In some embodiments, the conveyor may be mounted on one or more bars or axles, where the bars or axles are supported by neck 12 on at least one side but do not extend through the wall of neck 12 on at least one of the sides of neck 12 that supports the bars. In some embodiments, smaller or peripheral axles may not extend into neck 12 at all, but rather may be supported for example by a connector system, while a main axle may extend at least partially into or through neck 12. The axle extending into neck 12 may, on one side of neck 12, extend only partially into neck 12, without extending beyond the limit of neck 12.

According to some embodiments of the invention, cover 18 may be removed from container 11 to allow filling of container 11 with the dry food to be dispensed. Cover 18 may be replaced, possibly sealing the upper side of container 11. Rotation of handle 14 may lead to a circular movement of shaft 29 and main bar 23 which may lead to a circular movement of belt 22 on outer cogwheel of bars 24 and 23. Dispensing section 31 may be positioned upward to receive the dry food and the rotation or circular movement of belt 22 may cause alignment of dispensing section 31 with open end 13 of container 11. The dry food or cereal may be discharged into a bowl positioned below open end 13 when a dispensing section is moved to the lower portion of the belt, inside open end 13.

FIGS. 3A and 3B depict different views of an element of a dry food dispensing device, according to one embodiment of the present invention. Referring to FIG. 3A a flexible paddle belt 22 including a plurality of possibly falcate flexible paddles or blades 26 may be mounted on connectors 25. A set of dispensing sections 31 may be formed between the adjacent blades 26. Any number of blades may be used. The number of blades 26 and the size of blades 26 may depend on the size of the pieces of the food to be dispensed. Paddle belt 22 may include any number of blades 26 in order to regulate the serving portion dispensed by increasing or decreasing the angle between adjacent blades 26.

According to one embodiment of the invention, referring to FIG. 3B, eight adjacent blades 26 may be used. The oval shape of connectors 25, the shape of belt 22 when extended across two or more axles, and the number of blades 26 may allow multiple blades such as blades 26*a* and 26*b* to be in contact with neck 12 of container 11 at the same time in order to allow a better sealing of container 11 and possibly to provide hermetic sealing, while maintaining the hygiene and freshness of the contents of container 11. Other numbers of blades, and other shapes of blades, may be used.

It should be noted that although a portion of the discussion may relate to holding and dispensing of dry food such as breakfast cereal, the present invention is not limited in this regard, and embodiments of the present invention may be used to hold and dispense other suitable materials.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. A device comprising:
   a container having a neck at the bottom of the container;
   a flexible conveyor belt comprising a plurality of paddles pointing outward from the belt, the belt disposed within the neck, at least two of the plurality of paddles in contact with the neck at any one time to provide a seal, the belt mounted on a plurality of axles, the plurality of axles comprising a main axle located at the center of the belt and two side axles located not at the center of the belt;

a handle extending from at least one of the axles; and a first opening on the bottom of the neck to dispense material and a second opening on the top of the container to accept material.

2. The device of claim 1, wherein the flexible belt is mounted on a connector.

3. The device of claim 1, wherein the outer circumference of the main axle and the outer circumference of the side axle each comprise cogs, and wherein the inner circumference of the belt includes openings accepting the cogs.

4. The device of claim 2, wherein the axles are attached to the connector.

5. The device of claim 1, comprising a second handle extended from at least one of the axles.

6. The device of claim 1, wherein the container comprises a sealable cover to hermetically seal the opening on the top of the container.

7. The device of claim 6, wherein the sealable cover is removed from the container to allow filling of the container with the material to be dispensed.

8. The device of claim 1 wherein the belt rotates within the container.

9. The device of claim 1, wherein the belt is turned by turning the handle.

10. The device of claim 1 comprising a stand to hold the container and position the container on a flat plane.

11. The device of claim 1, wherein the container comprises a transparent material.

12. A device comprising:

a container having a neck, the container having a flexible conveyor belt disposed within the neck, the belt comprising a plurality of paddles pointing outward from the belt, at least two of the plurality of paddles in contact with the neck at any one time to provide a seal, the belt mounted on a main axle located at the center of the belt and a plurality of side axles located not at the center of the belt; and a handle connected to at least one of the axles.

13. The device of claim 12, wherein the belt is mounted on a connector.

14. A device comprising:

a container having a neck; and a flexible conveyor belt disposed within the neck, the belt mounted on a plurality of axles, the plurality of axles comprising a main axle located at the center of the belt and a plurality of side axles located not at the center of the belt, such that the cross section of the belt is oblong, the belt comprising a plurality of paddles pointing outward from the belt, at least two of the plurality of paddles in contact with the neck at any one time to provide a seal;

wherein the container comprises a first opening at one end of the neck to dispense material and a second opening to accept material.

15. The device of claim 14, wherein the outer circumference of the main axle and the outer circumference of the side axles each comprise cogs, and wherein the inner circumference of the belt includes openings accepting the cogs.

* * * * *